United States Patent
Ozoemena et al.

(10) Patent No.: US 10,396,357 B2
(45) Date of Patent: *Aug. 27, 2019

(54) PRODUCTION OF A LAYERED LITHIUM-MANGANESE-NICKEL-COBALT OXIDE MATERIAL

(71) Applicant: CSIR, Pretoria (ZA)

(72) Inventors: Kenneth Ikechukwu Ozoemena, Pretoria (ZA); Charl Jeremy Jafta, Pretoria (ZA)

(73) Assignee: CSIR, Pretoria (ZA)

(*) Notice: Subject to any disclaimer, the term of this patent is extended or adjusted under 35 U.S.C. 154(b) by 240 days.

This patent is subject to a terminal disclaimer.

(21) Appl. No.: 15/322,626

(22) PCT Filed: Jul. 3, 2015

(86) PCT No.: PCT/IB2015/055023
§ 371 (c)(1),
(2) Date: Dec. 28, 2016

(87) PCT Pub. No.: WO2016/001884
PCT Pub. Date: Jan. 7, 2016

(65) Prior Publication Data
US 2017/0133678 A1    May 11, 2017

(30) Foreign Application Priority Data
Jul. 3, 2014 (ZA) .................. 2014/04912

(51) Int. Cl.
| | |
|---|---|
| H01M 4/525 | (2010.01) |
| H01M 4/505 | (2010.01) |
| H01M 10/0525 | (2010.01) |
| C01G 53/00 | (2006.01) |
| H01M 4/02 | (2006.01) |

(52) U.S. Cl.
CPC .......... H01M 4/525 (2013.01); C01G 53/50 (2013.01); H01M 4/505 (2013.01); H01M 10/0525 (2013.01); *C01P 2002/72* (2013.01); *C01P 2004/03* (2013.01); *C01P 2006/40* (2013.01); *H01M 2004/028* (2013.01)

(58) Field of Classification Search
CPC ....... H01M 10/0525; H01M 2004/028; H01M 4/505; H01M 4/525
See application file for complete search history.

(56) References Cited

FOREIGN PATENT DOCUMENTS

| | | |
|---|---|---|
| EP | 0913876 A1 | 6/1999 |
| WO | WO 2014/024075 A1 | 2/2014 |

OTHER PUBLICATIONS

G. T.-K. Fey, C.-S. Chang, T. P. Kumar. Synthesis and surface treatment of LiNi1/3Co1/3Mn1/3O2 cathode materials for Li-ion batteries, J. Solid State Electrochem. (2010) 14:17-26.*

C. J. Jafta., K. I. Ozoemena, M. K. Mathea, W. D. Roos. Synthesis, characterisation and electrochemical intercalation kinetics of nanostructured aluminium-doped Li[Li0.2Mn0.54Ni0.13Co0.13]O2 cathode material for lithium ion battery, Electrochimica Acta 85 (2012) 411-422.*

Fu Y P et al: "LiMn2-yMyO4 (M=Cr. Co) cathode materials synthesized by the microwave-induced combustion for lithium ion batteries," Journal of Alloys and Compounds, Elsevier Sequoia, Lausanne, CH, vol. 426. No. 1-2. Dec. 21, 2006 (Dec. 21, 2006), pp. 228-234.

Suryakala K et al: "Synthesis and characterization of LiCo x Mn2-x O4 powder by a novel CAM microwave-assisted sol-gel method for Li ion battery," Journal of Solid State Electrochemistry; Current Research and Development in Science and Technology, Springer, Berlin, DE, vol. 11. No. 12, May 4, 2007 (May 4, 2007), pp. 1671-1677.

Balaji et al: "A review on microwave synthesis of electrode materials for lithium-ion batteries," Ionics, vol. 15. No. 6, May 14, 2009 (May 14, 2009), pp. 765-777.

Charl J. Jafta et al: "Microwave-Assisted Synthesis of High-Voltage Nanostructured LiMn 1.5 Ni 0.5 O 4 Spinel: Tuning the Mn 3+ Content and Electrochemical Performance", ACS Applied Materials & Interfaces, vol. 5, No. 15, Aug. 14, 2013 (Aug. 14, 2013), pp. 7592-7598.

International Search Report issued in co-pending International Patent Application No. PCT/IB2015/055023, European Patent Office, dated Oct. 13, 2015, 4 pages.

Written Opinion issued in co-pending International Patent Application No. PCT/IB2015/055023, European Patent Office, dated Oct. 13, 2015, 5 pages.

* cited by examiner

*Primary Examiner* — Carlos Barcena
(74) *Attorney, Agent, or Firm* — McDonnell Boehnen Hulbert & Berghoff LLP

(57) ABSTRACT

A process for producing a layered lithium-manganese-nickel-cobalt oxide material, includes producing a raw layered lithium-manganese-nickel-cobalt oxide ('LMNC') material. Optionally, a dopant capable of enhancing the performance of the layered LMNC material when used as a cathode material in an electrochemical cell, is introduced during the production of the raw LMNC material. Before any annealing of the raw LMNC material is effected, it is subjected to microwave treatment. The resultant treated material is annealed to obtain the layered LMNC material.

10 Claims, 10 Drawing Sheets

PRODUCTION OF A LAYERED LITHIUM-MANGANESE-NICKEL-COBALT OXIDE MATERIAL

This application is a National Stage Application of International Patent Application No. PCT/IB2015/055023, filed Jul. 3, 2015, which claims the benefit of, and priority to, South African Patent Application No. 2014/04912, filed Jul. 3, 2014, the contents of these applications being incorporated entirely herein by reference.

THIS INVENTION relates to the production of a layered lithium-manganese-nickel-cobalt oxide material. It relates in particular to a process for producing a layered lithium-manganese-nickel-cobalt oxide material suitable for use as a cathode material in a lithium-ion electrochemical cell or battery, and to an electrochemical cell incorporating the layered lithium-manganese-nickel-cobalt oxide material.

With the burgeoning world population and the ever increasing demand for energy, the world faces an energy crisis with fossil fuels being depleted and causing global warming. In an effort to keep up with these demands, energy conversion technologies, focussing on lithium-ion cell battery research, for energy storage, are at the forefront.

It is known that layered lithium-manganese-nickel-cobalt oxide materials can be used as cathode materials in lithium-ion electrochemical cells or batteries; however, these known materials have limitations when used as cathode materials, including inadequate capacity, rate capability and capacity retention/cyclability.

It is hence an object of this invention to provide a process for producing a layered lithium-manganese-nickel-cobalt oxide material which provides improved performance when used as a cathode material in a lithium-ion electrochemical cell or battery.

Thus, according to a first aspect of the invention, there is provided a process for producing a layered lithium-manganese-nickel-cobalt oxide material, which includes
   producing a raw layered lithium-manganese-nickel-cobalt oxide ('LMNC') material;
   optionally, introducing a dopant capable of enhancing the performance of the layered LMNC material when used as a cathode material in an electrochemical cell, during the production of the raw layered LMNC material;
   before any annealing of the raw layered LMNC material is effected, subjecting it to microwave treatment, to obtain a treated material; and
   annealing the treated material, to obtain the layered LMNC material.

The process is characterized thereby that the production of the raw layered LMNC material does not include any heat treatment at a temperature greater than 600° C., preferably not greater than 550° C., most preferably not greater than about 500° C. In particular, production of the raw layered LMNC material does not involve heat treatment which would result in annealing of the material prior to the microwave treatment thereof.

The production of the raw layered LMNC material may include heat treatment at a temperature not exceeding 600° C., preferably not exceeding 550° C., typically not exceeding about 500° C.

When no dopant is present, the layered LMNC material may be $Li[Li_{0.2}Mn_{0.54}Ni_{0.13}Co_{0.13}]O_2$, $Li[Ni_{0.33}Mn_{0.33}Co_{0.33}]O_2$ (also known as 'NMC-333'), $Li[Ni_{0.4}Mn_{0.4}Co_{0.2}]O_2$ (also known as 'NMC-442'), or the like. Typically, the layered LMNC material is $Li[Li_{0.2}Mn_{0.54}Ni_{0.13}Co_{0.13}]O_2$.

The raw layered LMNC material may, at least in principle, be produced by any appropriate process or method, such as a modified Pechini method, a sol-gel method, a co-precipitation method, or the like. Typically, however, the production of the raw layered LMNC material may be by means of a modified, one-step, powder-forming Pechini method.

Thus, the production of the raw LMNC material may be effected by
   maintaining a solution comprising a dissolved lithium compound, a dissolved manganese compound, a dissolved nickel compound, a dissolved cobalt compound, optionally a dissolved dopant compound, a hydroxycarboxylic acid, and a polyhydroxy alcohol, at an elevated temperature $T_1$, where $T_1$ is below the boiling point of the solution, until the solution gels;
   maintaining the gel at an elevated temperature until it ignites and burns to form a Li—Mn—Ni—Co—O powder; and
   calcining the Li—Mn—Ni—Co—O powder to burn off carbon and/or other impurities present in the powder, thereby to obtain the raw layered LMNC material.

The process may include forming the solution of the lithium compound, the manganese compound, the nickel compound, the cobalt compound, optionally the dissolved dopant compound, the hydroxycarboxylic acid, and the polyhydroxy alcohol. The forming of the solution may then include admixing a solution of the lithium compound dissolved in a solvent, a solution of the manganese compound dissolved in a solvent, a solution of the nickel compound dissolved in a solvent, a solution of the cobalt compound dissolved in a solvent, optionally a solution of the dopant compound dissolved in a solvent, the hydroxycarboxylic acid and the polyhydroxy alcohol.

While the lithium compound, the manganese compound, the nickel compound, the cobalt compound and, optionally, the dopant compound can initially each be in the form of a separate solution in which each is dissolved, they are preferably all dissolved in the same solvent so that a single solution containing the dissolved lithium, manganese, nickel, cobalt, optionally dopant, compounds is then admixed with the hydroxycarboxylic acid and the polyhydroxy alcohol. The lithium, manganese, nickel and cobalt compounds are preferably water soluble so that water, preferably deionized water, can be used as the solvent of the solution. Thus, in particular, nitrates of lithium, manganese, nickel and cobalt may be used, i.e. $LiNO_3$, $Mn(NO_3)_2$ (more particularly $Mn(NO_3)_2 \cdot 4H_2O$), $Ni(NO_3)_2$ (more particularly $Ni(NO_3)_2 \cdot 6H_2O$) and $Co(NO_3)_2$ (more particularly $Co(NO_3)_2 \cdot 6H_2O$) may be used. The solution may thus contain the necessary stoichiometric amounts of $LiNO_3$, $Mn(NO_3)_2 \cdot 4H_2O$, $Ni(NO_3)_2 \cdot 6H_2O$ and $Co(NO_3)_2 \cdot 6H_2O$ to obtain $Li[Li_{0.2}Mn_{0.54}Ni_{0.13}Co_{0.13}]O_2$ as the end product.

The dopant, when present, will, as set out hereinbefore, be selected to improve electrochemical performance, particularly stability, of the resultant layered LMNC material. The dopant may be an element of Groups IIA, IIIA or IVA of the Periodic Table of Elements. More particularly, the dopant may be aluminium, germanium or magnesium; however, preferably the dopant is an element of Group IIIA of the Periodic Table of Elements, particularly aluminium. Such dopant compound will thus also be water soluble, and may be a nitrate of aluminium, e.g. $AlN_3O_9 \cdot 9H_2O$. When the dopant is present, the end product will thus be a layered-lithium-manganese-nickel-cobalt-aluminium oxide ('LMNCA') material. The end product may then, in particular, be $Li[Li_{0.2}Mn_{0.52}Ni_{0.13}Co_{0.13}Al_{0.02}]O_2$.

Preferably, both the dopant introduction and the microwave treatment are effected.

The metallic compounds, i.e. the lithium, manganese, nickel, cobalt and aluminium compounds, may instead be any other metallic salts (derived from both weak and strong acids such as the sulphates, carbonates, halides, and the acetates) other than the nitrates.

The hydroxycarboxylic acid acts as a reduction agent, and may be citric acid.

The polyhydroxy alcohol may be ethylene glycol or polyethylene glycol.

The citric acid and the ethylene glycol may be present in the solution in an appropriate molar ratio of citric acid to ethylene glycol, e.g. about 1:4. The citric acid may initially be in the form of a solution thereof in water, particularly deionized water.

The process may comprise initially heating the mixture of the citric acid solution and the ethylene glycol to the temperature $T_1$ with stirring; thereafter, the solution of the lithium, manganese, nickel, cobalt and, when present, aluminium nitrates may be added slowly, e.g. dropwise, to the citric acid/ethylene glycol solution.

As set out hereinbefore, $T_1$ is below the boiling point of the solution comprising the solvent for the lithium, manganese, nickel, cobalt, and, when present, aluminium compounds; the dissolved lithium, manganese, nickel, cobalt and, when present, the aluminium, compounds; the hydroxycarboxylic acid and the polyhydroxy alcohol. It is important that $T_1$ be below the boiling point of the solution, to prevent premature evaporation of the solvent and other components of the solution, i.e. to prevent such evaporation before the gel-forming reaction (polymer gel formation) is complete. When the solvent is water as hereinbefore set out, then $90°$ C.$\leq T_1 < 100°$ C. Preferably, $T_1$ may then be about $90°$ C.

The elevated temperature at which the gel is maintained may be $T_2$, where $90°$ C.$\leq T_2 < 100°$ C. Preferably, $T_2$ is the same as $T_1$. In other words, preferably the solution is maintained at $T_1$ until there has been complete or adequate gel formation, and the gel is then maintained at $T_1$ until it ignites and burns to form the Li—Mn—Ni—Co—O powder, or a Li—Mn—Ni—Co—Al—O powder when aluminium is present as a dopant. The time $t_1$ that the solution must be maintained at $T_1$ for complete gel formation and evaporation of liquid components of the solution, and that the gel must be maintained at until it ignites, is dependent on factors such as the volume of the solution, $T_1$, etc. but is typically at least 30 minutes.

The calcination of the Li-MN-Ni—Co—O or Li—Mn—Ni—Co—Al—O powder may be effected at a temperature $T_3$. $T_3$ will thus be sufficiently high for carbon and/or other impurities present in the powder to burn off. The calcination will thus be effected in a non-reducing atmosphere, preferably in an oxidizing atmosphere. Thus, $T_3$ may be as low as $300°$ C. to $350°$ C. However, more preferred is $400°$ C.$\leq T_3 < 600°$ C.; typically, $T_3$ is about $500°$ C. The calcination may be continued for a period of time $t_2$, with $t_2$ thus being long enough to achieve burning off of carbon and/or other impurities to a desired degree, and with $t_2$ also being dependent on factors such as the quantity of powder, $T_3$, etc. Thus, preferably, $t_2 < 12$ hours; typically, $t_2$ may be about 6 hours.

The annealing of the treated material or powder may be effected at a temperature $T_4$. $T_4$ will thus be sufficiently high to crystallize the powder. Thus, preferably, $700°$ C.$\leq T_4 \leq 900°$ C. Typically, $T_4$ may be about $700°$ C. The annealing may be effected for a period of time $t_3$, with $t_3$ thus being long enough to achieve a desired degree of annealing, i.e. to achieve a desired degree of crystallinity of the powder. Typically, $t_3$ will be less than 12 hours, e.g. about 8 hours.

The microwave treatment may comprise subjecting the calcined powder to microwaves (typically at $\lambda=0.12236$ m, 600 W) at about $60°$ C. for between 10 and 20 minutes, typically about 15 minutes. The microwave power may be less than or greater than 600 W.

As also discussed in more detail hereinafter, the inventors surprisingly found that by producing $[Li_{0.2}Mn_{0.54}Ni_{0.13}Co_{0.13}]O_2$ or $Li[Li_{0.2}Mn_{0.52}Ni_{0.13}Co_{0.13}Al_{0.02}]O_2$ using a modified, one step, powder forming Pechini method, coupled with a microwave irradiation of the powder, the $Mn^{4+}$ content and site disorder can be controlled, thereby enhancing/maintaining electrochemical performance, e.g. capacity, cyclability, elimination of impurities, etc. It is thus not necessary to partially substitute Ni and/or Mn and/or Co with metallic elements such as Ti, Fe, Cr, Ru or Mg to achieve this purpose. The process of the invention is thus characterized thereby that it does not include adding to any of the solutions and/or to the powder a metallic element such as Ti, Fe, Cr, Ru or Mg for purposes of partially replacing some of the Ni and/or Mn and/or Co in $[Li_{0.2}Mn_{0.54}Ni_{0.13}Co_{0.13}]O_2$ or $Li[Li_{0.2}Mn_{0.52}Ni_{0.13}Co_{0.13}Al_{0.02}]O_2$. Thus, the end product does not contain any Ti, Fe, Cr, Ru or Mg.

According to a second aspect of the invention, there is provided an electrochemical cell, which includes a cell housing, a cathode, an anode and an electrolyte in the cell housing, in which the cathode is electronically insulated from the anode but electrochemically coupled thereto by the electrolyte the cathode comprising the layered LMNC material produced by the process according to the first aspect of the invention.

The invention will now be described in more detail with reference to the following non-limiting example and accompanying drawings.

IN THE DRAWINGS

Figure 8:
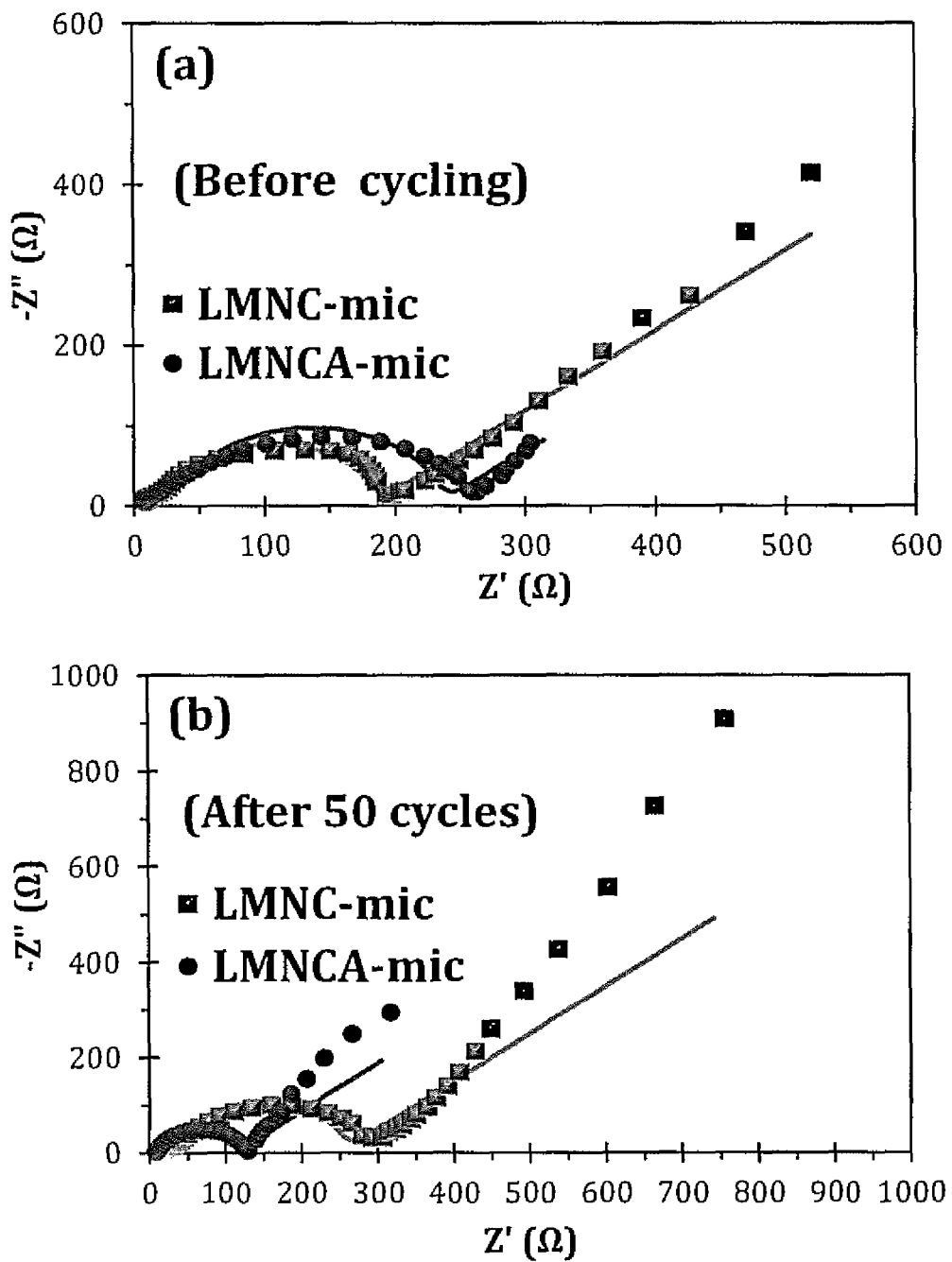
Figure 9:
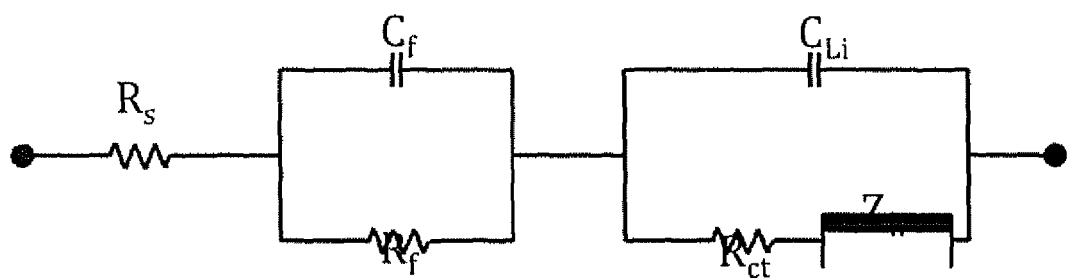
Figure 10:
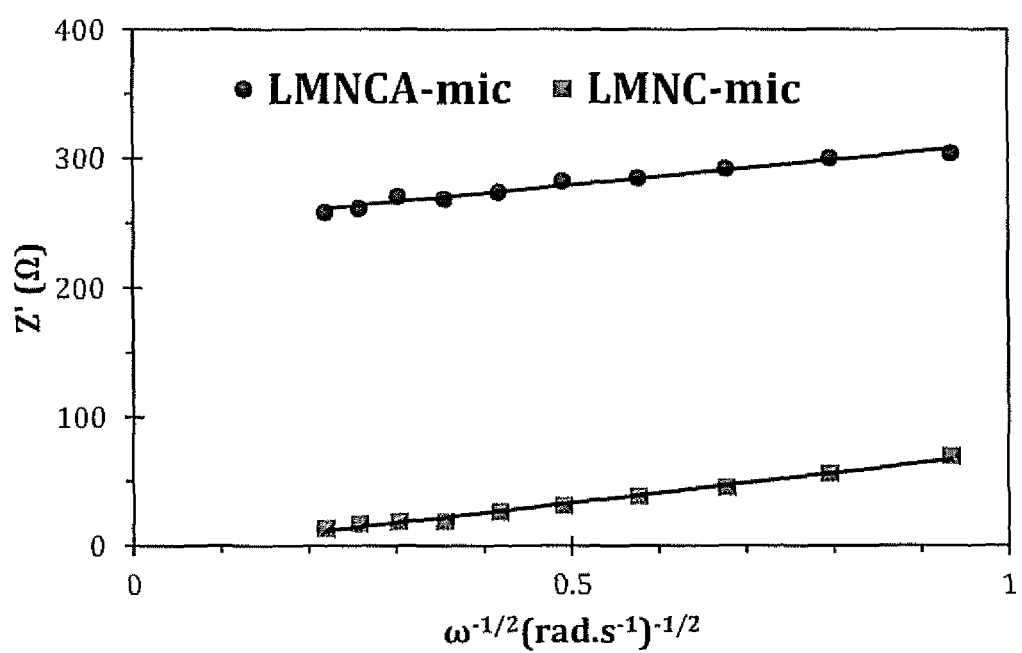

FIG. 8 comprises comparative Nyquist plots of LMNC-mic and LMNCA-mic (a) before the $1^{st}$ cycle and (b) after 50 cycles. Data points are experimental while solid lines are fitted data;

FIG. 9 shows the Electrical Equivalent Circuit (EEC) used to fit the experimental EIS data; and FIG. 10 shows plots of Z vs $\omega^{-1/2}$ of LMNC-mic and LMNCA-mic.

EXAMPLE

Experimental

Parent Li[Li$_{0.2}$Mn$_{0.54}$Ni$_{0.13}$Co$_{0.13}$]O$_2$ (LMNC) and Al doped Li[Li$_{0.2}$Mn$_{0.52}$Ni$_{0.13}$Co$_{0.13}$Al$_{0.02}$]O$_2$ (LMNCA) were prepared using a modified, one-step powder-forming Pechini method. Citric acid (CA), ethylene glycol (EG) and metal (Li, Ni, Co, Al) nitrates were used as starting materials. The reducing agent, CA (dissolved in deionised water) and EG were mixed in a molar ratio of 1:4 (CA:EG) and heated at approximately 90° C. while constantly stirring for 30 minutes. Stoichiometric amounts of LiNO$_3$, Ni(NO$_3$)$_2$.6H$_2$O, Co(NO$_3$)$_2$.6H$_2$O, Mn(NO$_3$)$_2$.4H$_2$O and, for the LMNCA material, AlN$_3$O$_9$.9H$_2$O, were dissolved in deionised water and then introduced, drop-wise, to the reducing solution comprising the CA and EG. Each solution or sample was then dehydrated into a gel. The gels were kept at a temperature of 90° C. until the solutions spontaneously formed the desired powders. The powders (LMNC and LMNCA) were preheated at 500° C. for 6 hours and each divided into two batches. The one batch was annealed at 700° C. for 8 hours where the temperature was increased at a rate of 10° C./minute, and then left to cool naturally (the electricity supply to the filaments was switched off after 8 hours) to room temperature (the resultant samples were designated LMNC and LMNCA respectively). The other half was irradiated with microwaves ($\lambda$=0.12236 m), where the power was increased at a rate of 60 W per minute to 600 W and irradiated at this power for 15 minutes (the temperature of the samples reached a maximum of 60° C.) and then annealed at 700° C. for 8 hours where the temperature was increased at a rate of 10° C./minute, and then left to cool naturally (the electricity supply to the filaments was switched off after 8 hours) to room temperature (the resultant samples were designated LMNC-mic and LMNCA-mic respectively).

The structural characterization was done by XRD using a Bruker AXS D8 ADVANCE X-ray Diffractometer with Ni-filtered Cu K$_\alpha$ radiation ($\lambda$=1.5406 Å). The scanning speed was 0.02° per step with a dwell time of 5 s for all samples. The sample powders were mounted in PHI 5400 ESCA and PHI 5000 Versaprobe-Scanning ESCA Microprobe vacuum chambers with base pressures $\leq 1\times 10^{-8}$ Torr. XPS was performed on the samples using a non-monochromatic aluminium (Al) K$_\alpha$ source (1486.6 eV) and an Al monochromatic K$_\alpha$ source (1486.6 eV), respectively. The XPS data analysis was performed with the XPS Peak 4.1 program and a Shirley function was used to subtract the background.

Electrochemical measurements were performed in a two-electrode coin cell (LIR-2032) assembled with the LMNC or LMNCA material as the positive electrode and lithium metal foil as the negative electrode using a MACCOR series 4000 tester. The cathodes were prepared by coating the slurry of a mixture composed of 80% active material, 10% acetylene black, and 10% polyvinylidene fluoride onto cleaned and polished aluminium foil. Subsequently, the materials were dried at 90° C. under vacuum (~$10^{-1}$ Torr) for 24 h. The cells were assembled in an argon-filled MBraun glovebox (O$_2$, H$_2$O<0.5 ppm). The electrolyte was 1M LiPF$_6$ in a mixture of 1:1 (v/v) EC:DMC. A polypropylene film (Celgard 2300, Celgard LLC, Charlotte, N.C., USA) was used as the separator.

Results and Discussion

Figure 1:
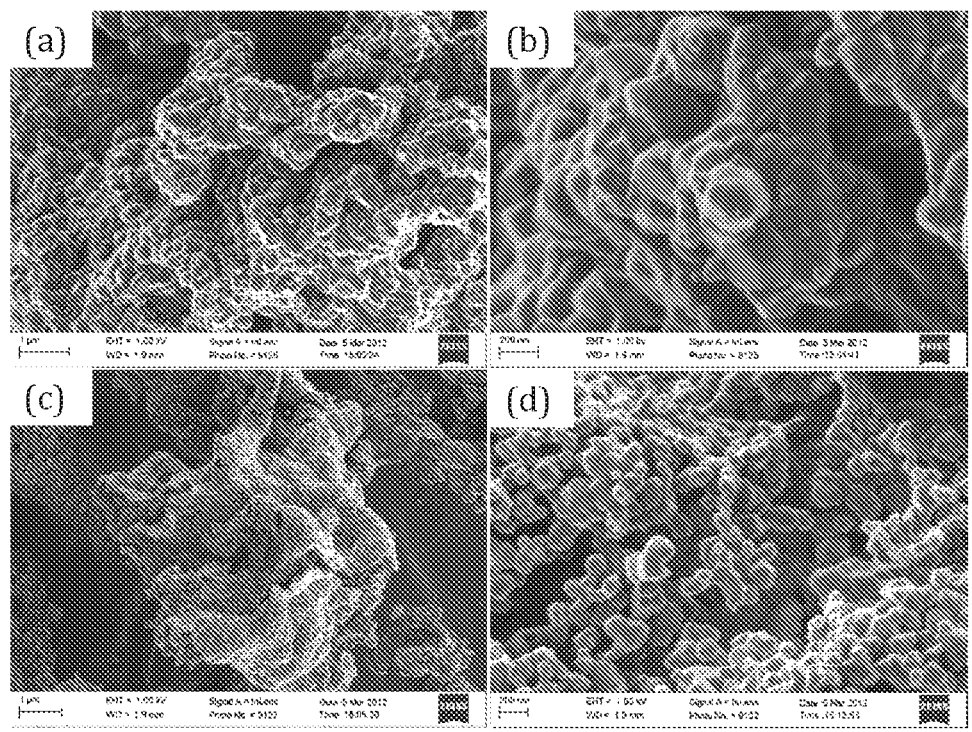
FIG. 1 shows FESEM images of (a) LMNC-mic at low magnification, (b) LMNC-mic at high magnification, (c) LMNCA-mic at low magnification and (d) LMNCA-mic at high magnification.

FIG. 1 shows a comparison of the SEM images of LMNC-mic and LMNCA-mic, reflecting that the synthesised materials comprised of nano-sized particles with sizes in the 250-300 nm range for the LMNC-mic, and 100-200 nm range for the LMNCA-mic. These particle sizes are comparable to those of un-microwaved samples (LMNC and LMNCA).

Figure 2:
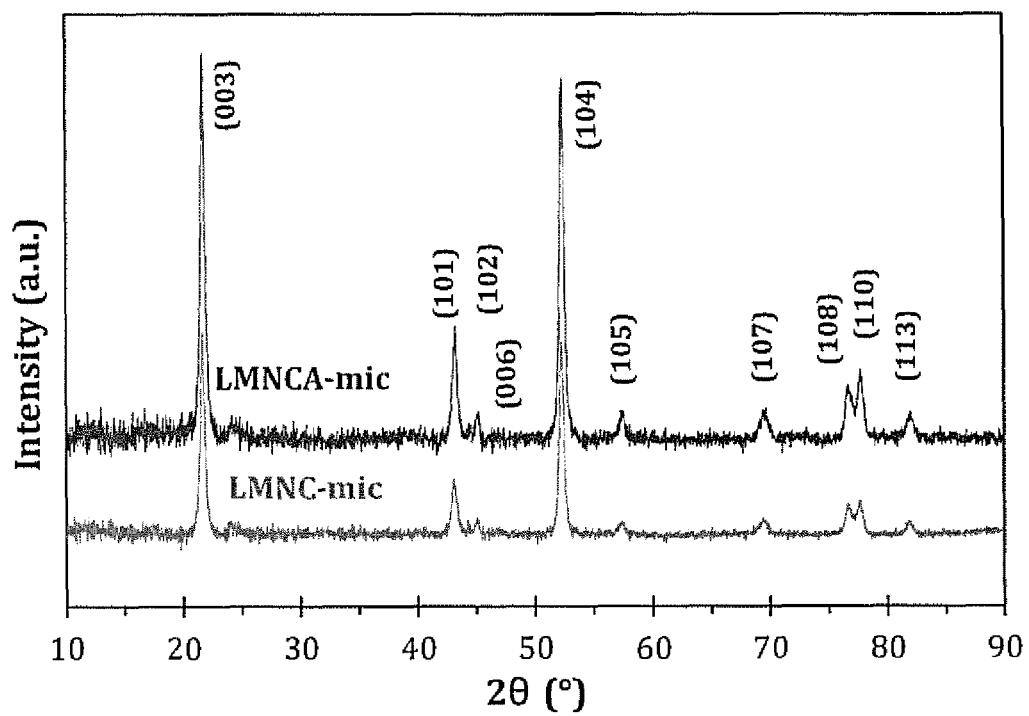
FIG. 2 shows X-Ray Diffraction (XRD) patterns of LMNC-mic ($Li[Li_{0.2}Mn_{0.54}Ni_{0.13}Co_{0.13}]O_2$) and LMNCA-mic ($Li[Li_{0.2}Mn_{0.52}Ni_{0.13}Co_{0.13}Al_{0.02}]O_2$)

FIG. 2 shows XRD spectra of LMNC-mic and LMNCA-mic recorded from 2θ=10°-90°. All the peaks are attributed to the typical peaks of a hexagonal phase with space group R$\bar{3}$m, except for the super lattice peaks found between 2θ=22°-30° characteristic of the presence of a Li$_2$MnO$_3$-type integrated phase, which by contrast adopts the C2/m space group. The intensity ratio of the 101/(006+102) peaks is greater than 2 which is an indication that the cation mixing between Li and transition metal layers is small. The lattice parameters, a and c, were calculated using the Rietveld and least squares methods and are summarized in Table 1.

TABLE 1

Structure parameters of the LMNC and LMNCA samples

| Sample | a (Å) | c (Å) | c/a |
|---|---|---|---|
| LMNC-mic | 2.852 | 14.216 | 4.985 |
| LMNCA-mic | 2.846 | 14.233 | 5.001 |

The lattice parameters a and c represent the interlayer metal-metal distance and the inter-slab distance, respectively. The LMNCA-mic has a higher c/a ratio compared to the LMNC-mic, indicating a higher cation ordering of the LMNCA-mic. The LMNCA also showed a better cation ordering compared to the LMNC, but the LMNCA-mic has a superior cation ordering. The inventors thus showed that when doping with a minute amount of Al (x=0.02) that there is almost no change in the a lattice parameter but a slight increase in the c lattice parameter. This is attributed to the increased ionic radius of Al$^{3+}$ (r(Al$^{3+}$)=53.5 pm) compared to the smaller ionic radius of Mn$^{4+}$ (r(Mn$^{4+}$)=53.0 pm) [11]. Also, the increase in the c lattice parameter, in layered materials, is associated with faster Li diffusion due to the decrease in the activation energy of Li hopping. Again, the LMNCA-mic shows a greater c lattice and thus faster Li diffusion is expected that would result in better rate capability compared to the cathode materials LMNC, LMNCA and LMNC-mic. The c/a ratio is an indication of the hexagonal setting, with a larger ratio indicating higher cation ordering. Partial cation mixing is said to occur if the c/a ratio falls below 4.96. The high c/a ratio, well above that required for distortion of the oxygen lattice, clearly confirms the formation of the layered structure. These ratios are in good agreement with known values. It has thus been shown that the samples that have been treated with microwaves (LMNC-mic and LMNCA-mic) show the highest c/a ratios (4.985 and 5.001 for LMNC-mic and LMNCA-mic, respectively), compared to the un-microwaved samples (LMNC and LMNCA), and thus has the least cation mixing.

Figure 3:
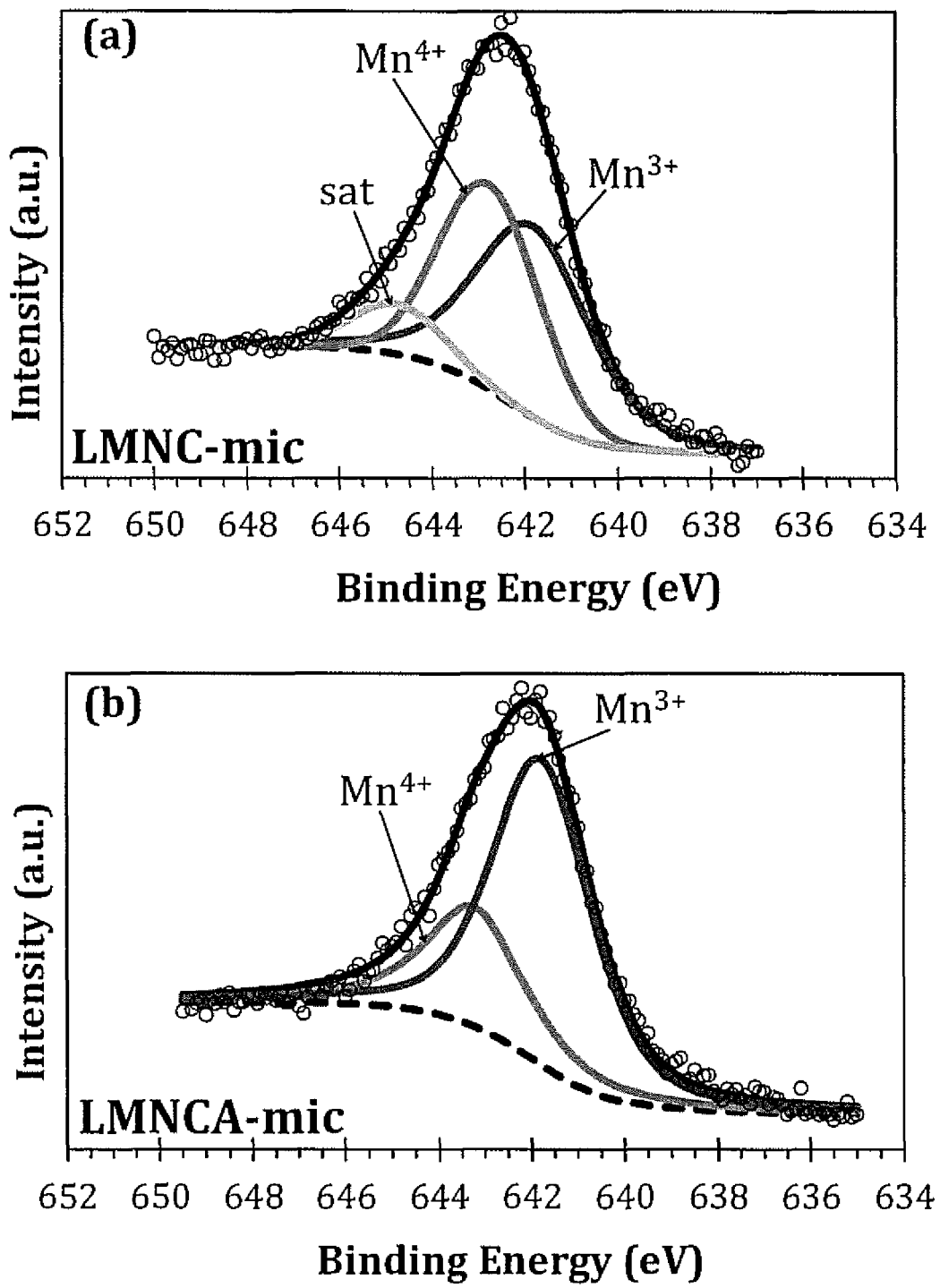
FIG. 3 shows X-ray Photoelectron Spectroscopy (XPS) spectra of (a) LMNC-mic and (b) LMNCA-mic, showing the Mn $2p_{3/2}$ peak.

FIG. 3 shows the detailed XPS spectra of the Mn 2p$_{3/2}$ peaks of the LMNC-mic (FIG. 3(a)) and LMCA-mic (FIG. 3(b)).

There is a broadening in both the peak widths, an indication that the Mn exist in more than one oxidation state. In order to confirm the oxidation states and to approximate their contribution to the total peak, the Mn 2p$_{3/2}$ of the LMNC and the LMNCA peaks were deconvoluted into two and three peaks, respectively, as this gives the best statistical fit. The third peak observed from the LMNC-mic is a satellite peak. The obtained binding energy positions and cation distribution are summarised in Table 2.

TABLE 2

Mn $2p_{3/2}$ peak positions and cation distribution

| Sample | Binding energy position(eV) | | Cation distribution | |
|---|---|---|---|---|
| | $Mn^{4+}$ | $Mn^{3+}$ | $Mn^{4+}$ | $Mn^{3+}$ |
| LMNC-mic | 642.8 | 641.8 | 44.9% | 55.1% |
| LMNCA-mic | 643.2 | 641.8 | 30.8% | 69.2% |

The binding energy peak positions corresponding to $Mn^{4+}$ and $Mn^{3+}$ are comparable with other known binding energy values. The microwaved cathode materials show a slightly higher oxidation state for Mn than the un-microwaved cathode materials. This increased oxidation state of manganese of the microwaved samples could be the reason for the increased capacity and the better stability. It is known that the rapid transformation of layered $LiMnO_2$ to spinel is due to the ease at which $Mn^{3+}$ disproportionates to $Mn^{2+}$ and $Mn^{4+}$. This then allows the Mn to move rapidly through tetrahedral sites as $Mn^{2+}$. $Mn^{4+}$ however, has a very high activation energy barrier for diffusion through tetrahedral sites. Therefore layered materials with a higher oxidation state for their manganese are expected to be more stable, as seen in this example. Also the specific capacity of Li-rich layered cathode materials can be controlled by controlling the initial ratio of transition metal cations, particularly lithium and manganese ions.

This method of synthesizing $Li[Li_{0.2}Mn_{0.54}Ni_{0.13}Co_{0.13}]O_2$ and the Al doped $Li[Li_{0.2}Mn_{0.52}Ni_{0.13}Co_{0.13}Al_{0.02}]O_2$ thus provides an opportunity to control the Mn oxidation state and thus engineer a cathode material with better properties.

Figure 4:
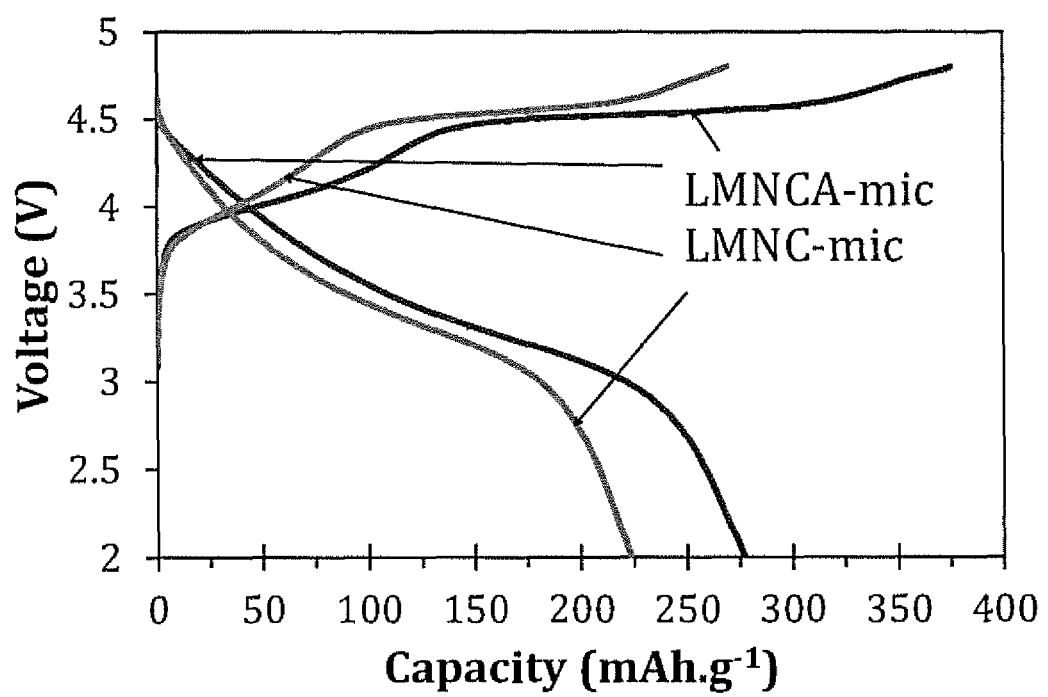
FIG. 4 shows first charge-discharge profiles of LMNC-mic and LMNCA-mic.

FIG. 4 compares the first charge-discharge profiles of LMNC-mic and LMNCA-mic at a rate of C/10 (i.e., ~22.5 mA·g$^{-1}$, note that 1 C corresponds to 225 mA·g$^{-1}$ current density).

Both electrodes show similar charge profiles with a prolonged voltage plateau at ~4.5 V. The LMNCA-mic showed a higher charge capacity of ~375 mAh·g$^{-1}$ compared to the LMNC-mic with a charge capacity of ~270 mAh·g$^{-1}$. This also applies for un-microwaved samples where the LMNCA had a higher charge capacity than the LMNC. The LMNCA-mic also has a higher first discharge capacity of ~278 mAh·g$^{-1}$ compared to the LMNC-mic with a discharge capacity of ~224 mAh·g$^{-1}$.

Figure 5:
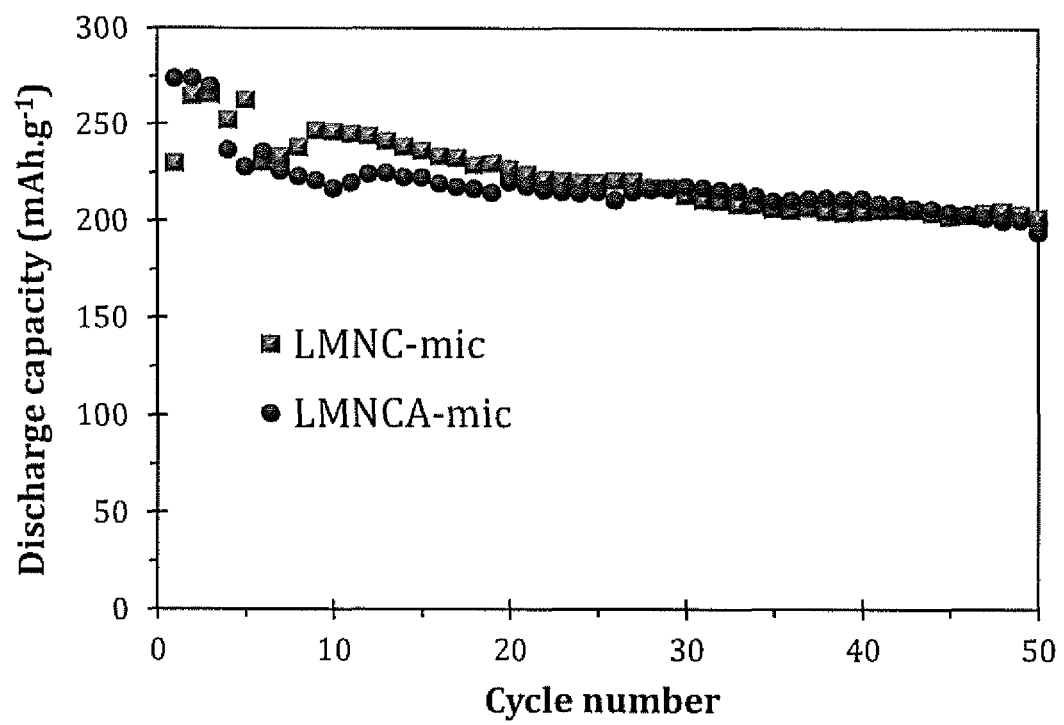
FIG. 5 shows cycle stability of LMNC-mic and LMNCA-mic at C/10 for 50 charge discharge cycles.

FIG. 5 compares the cycle stability at a rate of C/10 of LMNC-mic and LMNCA-mic when charged between 2.0 V and 4.8 V.

During the first 6 cycles these microwave treated samples showed unstable discharge capacities. From the 7$^{th}$ cycle the discharge capacities started to stabilize. The first 6 discharge capacities for LMNCA-mic and LMNC-mic, varied between ~270 mA·h·g$^{-1}$-~220 mA·h·g-1 and ~265 mA·h·g-1-~230 mA·h·g-1, respectively. It is worth noting that even though the LMNC-mic material has a better capacity at first, the LMNCA-mic shows a higher capacity from the 28th cycle due to its better stability.

Because Al is electrochemically inactive, the Al doped cathode material (LMNCA-mic) is expected to show a lower discharge capacity. When the Al doped material (LMNCA-mic) is synthesized by this hybrid microwave synthesis, the LMNCA-mic shows superior discharge capacity compared to the LMNC-mic. It is also worth noting that LMNC-mic and LMNCA-mic have better stability and discharged capacities compared to the un-microwaved materials.

Figure 6:
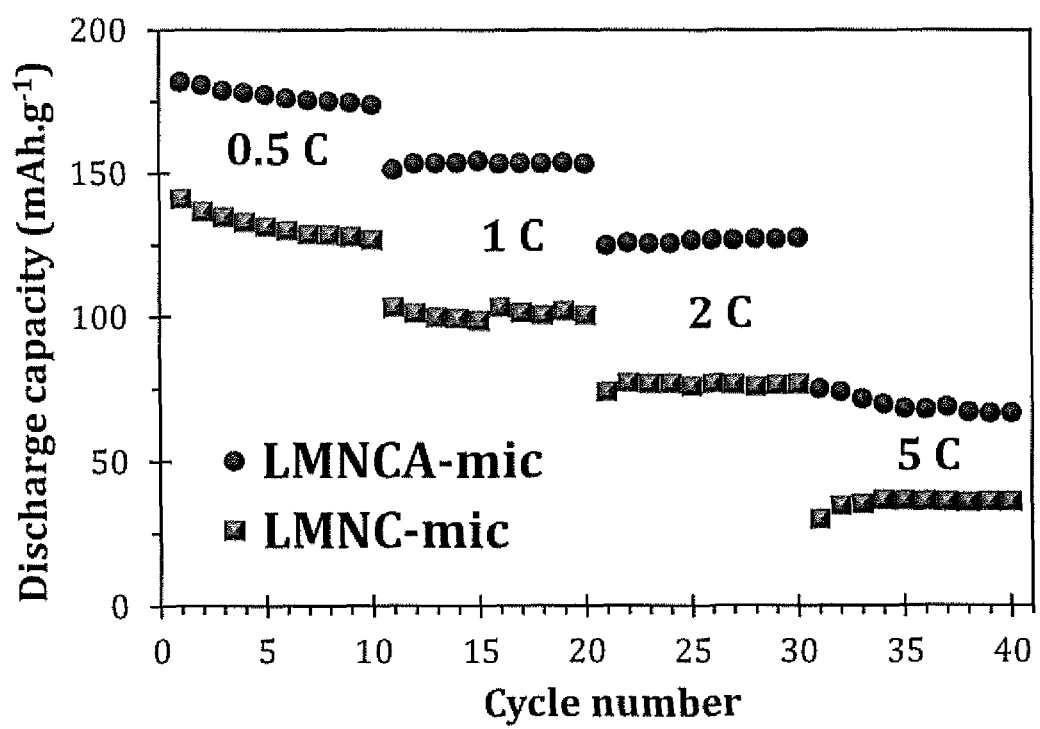
FIG. 6 shows typical rate capability of LMNC-mic and LMNCA-mic, charged and discharged at 0.5 C, 1 C, 2 C and 5 C.

FIG. 6 compares the rate capabilities, at charge and discharge rates of 0.5 C, 1 C, 2 C and 5 C, of the LMNC-mic and LMNCA-mic.

With the XRD data showing that LMNCA-mic has a bigger c lattice parameter compared to LMNC-mic it was thus expected that LMNCA-mic would have a better rate capability. As seen from FIG. 6, this is indeed the case. The c lattice is not the only factor responsible for high rate capability. The Mn cation state also plays a role—a high concentration $Mn^{3+}$ will increase the electron conductivity and better the rate capability. The material with the highest $Mn^{3+}$ concentration is also not the best in terms of rate capability, again as this is not the only factor contributing to better rate capability. Thus it is deduced that a good combination of the two (c lattice and $Mn^{3+}$ concentration) is needed for high rate capability.

Figure 7:
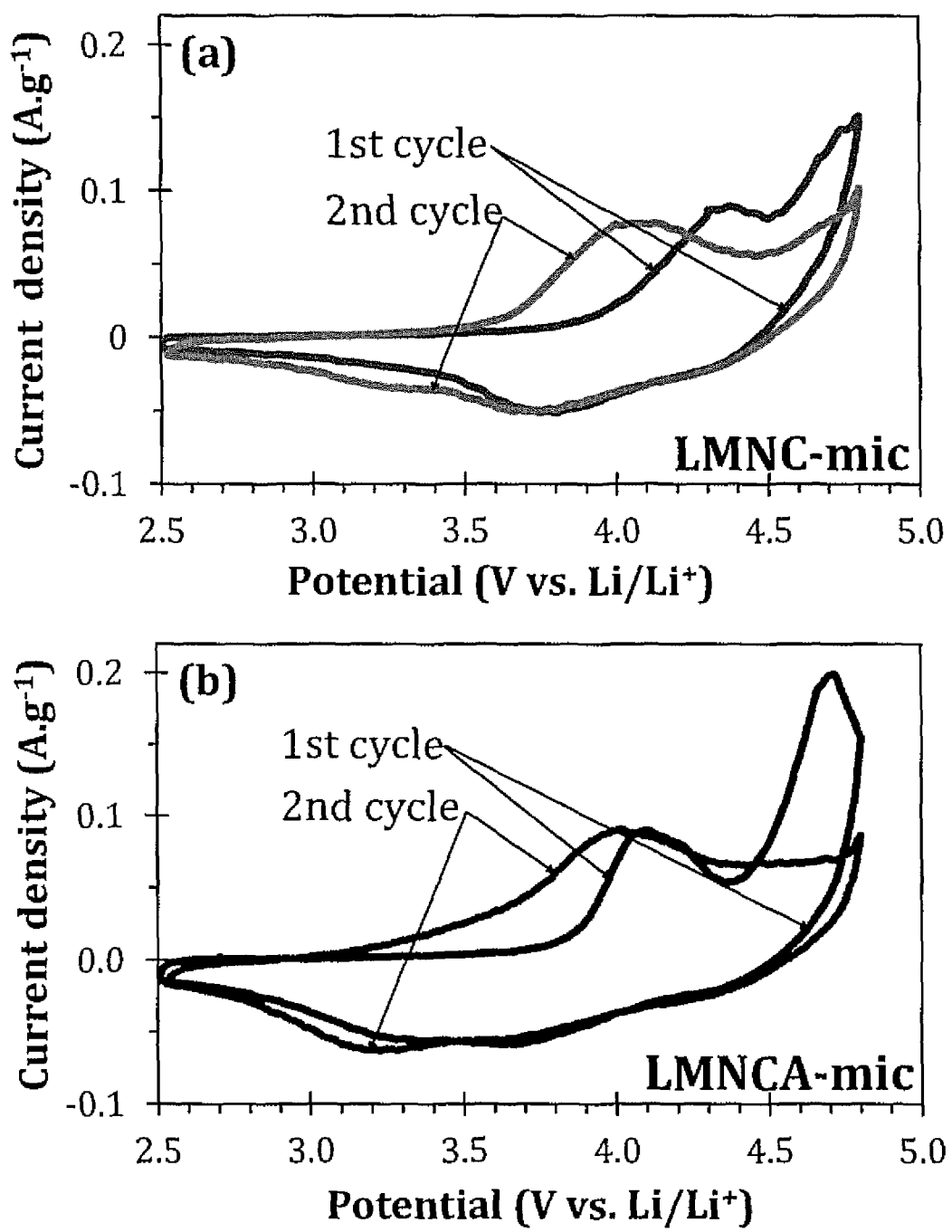
FIG. 7 shows cyclic voltammograms of (a) LMNC-mic and (b) LMNCA-mic obtained at a scan rate of $0.1$ mV·s$^{-1}$ (first and second cycles)

FIG. 7 shows the cyclic voltammetric evolutions of LMNC-mic and LMNCA-mic.

The initial and second cycle of the LMNC-mic and LMNCA-mic is interrogated using low scan rate cyclic voltammetry (0.1 mV·s$^{-1}$). The peaks at ~4.7 V, for both LMNC-mic and LMNCA-mic, of their initial cycles disappear with the 2$^{nd}$ cycle showing the irreversible removal of $Li_2O$. With the higher peak current at ~4.7 V for the LMNCA-mic, the higher first charge of the LMNCA-mic compared to the LMNC-mic can be explained (see FIG. 4). Thus it can be assumed that the microwave irradiation in the LMNCA-mic causes more oxygen vacancies and therefore result in a higher concentration of $Li_2O$ being removed.

Electrochemical impedance spectroscopy (EIS) represents an important technique for evaluating interfacial electrochemistry and the diffusion coefficient of lithium ion in lithium ion battery materials. The impedance spectra for the LMNC-mic and LMNCA-mic were measured at a potential of 3.5 V. The spectra were recorded before the 1$^{st}$ cycle and after the 50$^{th}$ cycle. Prior to every measurement, the cell was relaxed for 1 h. FIG. 8 presents typical Nyquist plots (Z' vs −Z") obtained for the LMNC-mic and LMNCA-mic cells.

A high-frequency semicircle and an intermediate-frequency semicircle composed into one semi-circle, and low frequency tails were observed. Generally, the high frequency semicircle is related to a passivating surface film, the solid-electrolyte interface (SEI). The intermediate frequency semicircle is ascribed to the resistance to charge-transfer process at the electrode/electrolyte interface. The low frequency tail is associated with the Li$^+$ ion diffusion process in the positive electrode.

The EIS spectra were fitted with an equivalent electrical circuit (EEC) shown in FIG. 9. The fitting parameters involve the solution ohmic resistance of the electrode system ($R_s$), solid electrolyte interface (SEI) film resistance ($R_f$), charge transfer resistance ($R_{ct}$) due to lithium intercalation/de-intercalation process, the capacitance of the surface film ($C_f$) and the interfacial capacitance ($C_{Li}$), and the Warburg element ($Z_w$) describing the solid state diffusion of lithium ions inside the active particles, signified by the straight sloping line (~45°) at the low frequency region.

The EIS parameters obtained for the LMNC-mic and LMNCA-mic are summarised in Table 3.

TABLE 3

Summary of EIS parameters extracted from the Nyquist plots.

| Sample | $R_s$ (Ω) | $R_f$ (Ω) | $C_f$ (μF) | $C_{Li}$ (μF) | $R_{ct}$ (Ω) | $Z_w$ (×10⁻⁴) |
|---|---|---|---|---|---|---|
| Before cycling | | | | | | |
| LMNC-mic | 7.0 ± 0.5 | 22.4 ± 2.2 | 0.7 ± 0.1 | 2.4 ± 0.2 | 152.6 ± 5.4 | 83.5 ± 4.6 |
| LMNCA-mic | 9.0 ± 0.6 | 31.4 ± 2.7 | 0.5 ± 0.0 | 2.2 ± 0.2 | 191.6 ± 7.2 | 80.2 ± 13.2 |
| After 50 cycles | | | | | | |
| LMNC-mic | 16.1 ± 1.3 | 26.7 ± 2.5 | 0.4 ± 0.1 | 2.5 ± 0.2 | 206.8 ± 9.0 | 48.7 ± 2.9 |
| LMNCA-mic | 8.1 ± 0.5 | 6.2 ± 1.5 | 1.9 ± 0.5 | 2.4 ± 0.2 | 98.2 ± 3.4 | 146.5 ± 8.7 |

The LMNCA-mic shows the same trend as that of LMNCA, where the surface film resistance ($R_f$) and the charge transfer resistance ($R_{ct}$) decrease with cycling. From the $R_{ct}$ and $R_f$ values it can be deduced that the SEI film covering the electrode surface is destroyed or replaced by redox-active active material with cycling, resulting in the decrease of the whole impedance of the battery cell. It is observed that, although the LMNCA-mic showed the highest impedance (both $R_f$ and $R_{ct}$) initially, the impedance values dramatically decreased much lower than the corresponding values for the LMNC-mic. For example, the LMNC-mic gave ~22Ω ($R_f$) and ~153Ω ($R_{ct}$) for the fresh cell and ~27Ω ($R_f$) and ~207Ω ($R_{ct}$) after 50 cycles, while the LMNCA-mic gave ~31Ω ($R_f$) and ~192Ω ($R_{ct}$) for the fresh cell and ~6Ω ($R_f$) and ~98Ω ($R_{ct}$) after the 50$^{th}$ cycle. It is worth noting that the impedance for the microwaved samples (LMNC-mic and LMNCA-mic) is lower when compared with the un-microwaved samples (LMNC and LMNCA).

The diffusion coefficient ($D_{app}$) of Lithium ions was calculated by means of Equation 1:

$$D_{Li} = \frac{2R^2T^2}{C_{Li}^2 n^4 F^4 A^2 \sigma^2} \quad (1)$$

Assuming diffusion coefficients of the oxidised and reduced Li species to be equal ($D_{ox}=D_{red}=D_{Li}$) and equal concentrations ($C_{ox}=C_{red}=C_{Li}$). $D_{Li}$ is the diffusion coefficient of the lithium ions, R the gas constant, T the absolute temperature, A the geometric surface area of the cathode, F the Faraday constant, n the number of electrons transferred per molecule during oxidation, $C_{Li}$ the lithium concentration in the cathode material and σ is the Warburg factor obtained from the slope of the real impedance (Z') vs. the reciprocal square root of the frequency in the low frequency region ($\omega^{-1/2}$) according to Equation 2, and as exemplified in FIG. 10 for EIS.

$$Z_w = \sigma(1-j)\omega^{-1/2} \quad (2)$$

As expected the calculated diffusion coefficient value for LMNC-mic of 1.59×10⁻¹³ cm²·s⁻¹ is inferior to the value for LMNCA-mic of 2.01×10⁻¹³ cm²·s⁻¹.

A green Pechini method was thus used to produce Li[Li$_{0.2}$Mn$_{0.54}$Ni$_{0.13}$Co$_{0.13}$]O$_2$ and Li[Li$_{0.2}$Mn$_{0.52}$Ni$_{0.13}$Co$_{0.13}$Al$_{0.02}$]O$_2$ after which the material was pre-heated, microwaved and then annealed. This synthesis method/procedure showed that the oxidation state of the manganese can be controlled by doping LMNC with Al, thereby increasing the Mn$^{3+}$ concentration, and/or microwaved where the Mn$^{4+}$ concentration would be increased. The results showed that the LMNCA-mic outperforms the LMNC-mic and ultimately is superior compared to LMNC, LMNCA and LMNC-mic. In other words, the process of the invention comprises a hybrid synthesis procedure employing conventional annealing and microwave radiation, with Li[Li$_{0.2}$Mn$_{0.54}$Ni$_{0.13}$Co$_{0.13}$]O$_2$ (LMNC-mic) and aluminium-doped Li[Li$_{0.2}$Mn$_{0.52}$Ni$_{0.13}$Co$_{0.13}$Al$_{0.02}$]O$_2$ (LMNCA-mic) being produced via this synthesis procedure. These cathode materials are characterized by SEM showing that they are nano particulate. The crystallinity and layeredness were determined via XRD and the lattice parameters were calculated from the data. The XPS measurements showed that there is a definite change in the oxidation state of the manganese due to microwave irradiation. The galvanostatic charge-discharge characterization showed that the aluminium doped cathode material that has been microwaved, has a superior discharge capacity and rate capability. The electrochemical performance of the LMNCA-mic proved to be superior.

In order to interpret observed microwave effects, two hypotheses can be considered. The first assumes the existence of a purely thermal effect (i.e. hot spots and temperature gradient) by dipolar polarization and ionic conduction. The second theory assumes that, besides thermal effects, there are also non-thermal effects like molecular interaction with the electromagnetic field. It is generally accepted that there are a number of characteristics specific to microwaves as agents for promoting chemical reactions: (i) the quantum energy of microwaves (10-5 eV) which is much lower than that of chemical bonds making it improbable for microwaves to break or weaken bonds within molecules; and (ii) the intensity of electric and magnetic fields that is unable to cause the shift of any chemical reaction equilibrium. However, it is known that microwave heating reveal results different from those obtained with conventional heating.

The approach to this invention was to develop an optimal strategy for producing a successful and economical synthesis procedure for cathode material. The strategy was to make use of microwave radiation in the primary stage and of conventional annealing in the later stage of synthesis. The inclusion of microwave irradiation in the production process enhances the electrochemical performance of both LMNC and LMNCA in terms of capacity, cyclability/capacity retention, and rate capability. This is due to the Mn$^{4+}$ concentration being controlled by the microwave irradiation and the Al doping.

The invention claimed is:

1. A process for producing a layered lithium-manganese-nickel-cobalt oxide material, which includes
producing a raw layered lithium-manganese-nickel-cobalt oxide ('LMNC') material, producing the raw layered LMNC material including:
maintaining a solution comprising a dissolved lithium compound, a dissolved manganese compound, a dissolved nickel compound, a dissolved cobalt compound, optionally a dissolved dopant compound, a hydroxycarboxylic acid, and a polyhydroxy alcohol, at an elevated temperature $T_1$, where $T_1$ is below the boiling point of the solution, until the solution gels;

maintaining the gel at an elevated temperature $T_2$, where $90° C. \leq T_2 < 100° C.$ and where $T_2$ is the same as $T_1$, so that the solution is effectively maintained at $T_1$ until there has been complete or adequate gel formation, until the gel ignites and burns to form a Li—Mn—Ni—Co—O powder; and calcining the Li—Mn—Ni—Co—O powder to burn off carbon and/or other impurities present in the powder, thereby to obtain the raw layered LMNC material;

optionally, introducing a dopant capable of enhancing the performance of the layered LMNC material when used as a cathode material in an electrochemical cell, during the production of the raw layered LMNC material;

before any annealing of the raw layered LMNC material is effected, subjecting it to microwave treatment, to obtain a treated material; and annealing the treated material, to obtain the layered LMNC material.

2. The process according to claim 1, which is characterized thereby that the production of the raw layered LMNC material does not include any heat treatment at a temperature greater than 600° C.

3. The process according to claim 1, wherein the production of the raw layered LMNC material includes heat treatment at a temperature not exceeding 600° C.

4. The process according to claim 1, wherein the layered LMNC material is $Li[Li_{0.2}Mn_{0.54}Ni_{0.13}Co_{0.13}]O_2$, $Li[Ni_{0.33}Mn_{0.33}Co_{0.33}]O_2$ or $Li[Ni_{0.4}Mn_{0.4}Co_{0.2}]O_2$.

5. The process according to claim 1, wherein the dopant is an element of Groups IIA, IIIA or IVA of the Periodic Table of Elements.

6. The process according to claim 5, wherein the dopant is aluminium.

7. The process according to claim 6, wherein the layered LMNC material is $Li[Li_{0.2}Mn_{0.52}Ni_{0.13}Co_{0.13}Al_{0.02}]O_2$.

8. The process according to claim 1, wherein the calcination of the Li—Mn—Ni—Co—O powder is effected at a temperature $T_3$, where $400° C \leq T_3 < 600° C$.

9. The process according to claim 1, wherein the annealing of the treated material is effected at a temperature $T_4$, where $700° C \leq T_4 \leq 900° C.$, to crystallize the material.

10. The process according to claim 1, wherein the microwave treatment comprises subjecting the calcined powder to microwaves at about 60° C. for between 10 and 20 minutes.

* * * * *